(12) United States Patent
DeCicco et al.

(10) Patent No.: US 6,781,058 B1
(45) Date of Patent: Aug. 24, 2004

(54) CABLE GUIDE ASSEMBLY FOR A VEHICLE SLIDING DOOR

(75) Inventors: Neal DeCicco, Hubbard, OH (US); Michael E. Scott, Austintown, OH (US); Thomas L. Wilson, Howland, OH (US)

(73) Assignee: Stoneridge Inc., Alphabet Division, Warren, OH (US)

( * ) Notice: Subject to any disclaimer, the term of this patent is extended or adjusted under 35 U.S.C. 154(b) by 0 days.

(21) Appl. No.: 10/370,373

(22) Filed: Feb. 20, 2003

(51) Int. Cl.$^7$ .......................... H02G 3/04; F16G 13/00; B60M 1/00; B60J 5/06

(52) U.S. Cl. ...................... 174/72 A; 174/69; 174/135; 59/78.1; 191/23 R; 296/155; 439/162

(58) Field of Search .................... 174/69, 70 C, 174/70 R, 72 A, 135, 136; 49/26–28; 59/78.1; 191/22 R, 23 R; 296/146.1, 149, 152, 155, 208; 439/162; 24/294, 295, 297; 248/63, 65, 67.7, 72, 200, 300, 505, 506, 510

(56) References Cited

U.S. PATENT DOCUMENTS

| | | | | |
|---|---|---|---|---|
| 1,865,134 A | * | 6/1932 | Plimpton | 248/200 |
| 2,445,606 A | * | 7/1948 | Davis | 248/539 |
| 2,749,068 A | * | 6/1956 | Wayman | 248/72 |
| 2,802,634 A | * | 8/1957 | Everett | 248/300 |
| 3,146,982 A | * | 9/1964 | Budnick | 248/68.1 |
| 3,292,888 A | * | 12/1966 | Fischer | 248/72 |
| 4,062,511 A | * | 12/1977 | Ray | 248/300 |
| 4,645,166 A | * | 2/1987 | Checkley et al. | 248/503.1 |
| 4,984,842 A | | 1/1991 | Ogawa et al. | 296/155 |
| 5,083,472 A | | 1/1992 | Kang | 74/89.21 |
| 5,178,247 A | * | 1/1993 | Vagaggini | 191/12 C |
| 5,316,244 A | * | 5/1994 | Zetena, Jr. | 248/49 |
| 5,316,365 A | | 5/1994 | Kuhlman et al. | 296/155 |
| 5,372,348 A | * | 12/1994 | Cheng | 248/447.2 |
| 5,495,640 A | * | 3/1996 | Mullet et al. | 16/97 |
| 5,533,561 A | * | 7/1996 | Forehand, IV | 160/188 |
| 5,536,061 A | | 7/1996 | Moore et al. | 296/155 |
| 5,581,944 A | * | 12/1996 | Kornbrekke et al. | 49/28 |
| 5,617,292 A | * | 4/1997 | Steiner | 361/706 |
| 5,649,415 A | * | 7/1997 | Pea | 59/78.1 |
| 5,742,982 A | * | 4/1998 | Dodd et al. | 24/16 R |
| 5,839,703 A | * | 11/1998 | Tesar | 248/65 |
| 5,906,071 A | * | 5/1999 | Buchanan, Jr. | 49/360 |
| 5,950,971 A | * | 9/1999 | Koumbis et al. | 248/200 |
| 5,992,919 A | | 11/1999 | Menke | 296/155 |
| RE36,428 E | | 12/1999 | Moore et al. | 296/155 |
| 6,036,259 A | | 3/2000 | Hertel et al. | 296/216.01 |
| 6,161,894 A | * | 12/2000 | Chapman | 296/155 |
| 6,174,020 B1 | * | 1/2001 | Knettle et al. | 296/155 |
| 6,176,715 B1 | * | 1/2001 | Buescher | 439/162 |
| 6,260,810 B1 | * | 7/2001 | Choi | 248/65 |
| 6,321,488 B1 | | 11/2001 | Bigoszewski et al. | 49/358 |
| 6,321,489 B1 | | 11/2001 | Murofushi et al. | 49/360 |

(List continued on next page.)

OTHER PUBLICATIONS

Advertising brochure for Microtrak® and Varitrak (Kabel Schlepp), p. 2.20.

Article entitled: "*Cable carrier powers vehicle doors,*" Design News, Dec. 16, 2002, p. 28.

*Primary Examiner*—Dean A. Reichard
*Assistant Examiner*—Adolfo Nino
(74) *Attorney, Agent, or Firm*—Kusner & Jaffe

(57) ABSTRACT

A cable guide assembly for use in connection with a vehicle sliding door. The cable guide assembly controls the movement of a cable carrier housing an electrical cable. The electrical cable is connected to components inside the sliding door and connected to components outside the sliding door. One end of the cable carrier follows the sliding door as it moves between open and closed position. The cable carrier is substantially maintained within a single plane during movement of the sliding door.

15 Claims, 4 Drawing Sheets

U.S. PATENT DOCUMENTS

| | | | |
|---|---|---|---|
| 6,340,199 B1 * | 1/2002 | Fukumoto et al. | 296/155 |
| 6,358,073 B1 | 3/2002 | Jhanson et al. | 439/164 |
| 6,435,600 B1 | 8/2002 | Long et al. | 296/155 |
| 6,449,905 B2 | 9/2002 | Maki | 49/360 |
| 6,460,813 B1 * | 10/2002 | Gretz | 248/62 |
| 6,481,195 B1 * | 11/2002 | Blase | 59/78.1 |
| 6,481,783 B1 | 11/2002 | Rogers, Jr. et al. | 296/155 |
| 6,492,592 B1 * | 12/2002 | Murofushi et al. | 174/72 A |
| 6,494,523 B2 * | 12/2002 | Kobayashi | 296/155 |
| 6,515,229 B2 * | 2/2003 | Aoki et al. | 174/72 A |
| 6,517,365 B1 * | 2/2003 | Bungo et al. | 439/162 |

\* cited by examiner

CABLE GUIDE ASSEMBLY FOR A VEHICLE SLIDING DOOR

FIELD OF THE INVENTION

The present invention relates to a cable guide assembly, and more particularly to a cable guide assembly for a vehicle sliding door.

BACKGROUND OF THE INVENTION

Sliding doors find use in connection with many types of vehicles. Most notably, sliding doors have been widely used for minivans. Some sliding door designs require wiring that connects electrical components located inside the door with a power source or other electrical components located outside the door. For instance, an electric motor may be located inside the sliding door to drive the opening and closing of the sliding door. Furthermore, an electric motor may be located inside the sliding door to drive the opening and closing of a powered window located inside the sliding door. Where wiring connects components inside the sliding door with other electrical components located elsewhere in the vehicle, the wiring must travel with the sliding door as it moves between the open and closed positions.

The present invention provides a cable guide assembly for maintaining and controlling an electrical cable connected with components located in a vehicle sliding door.

SUMMARY OF THE INVENTION

In accordance with the present invention, there is provided a cable guide assembly for a sliding door on a vehicle, which sliding door is movable along a track between an open position and a closed position, the cable guide assembly comprising: (1) an elongated, bendable cable carrier having a flexible conductor extending therethrough for connecting an electrical component inside the sliding door with an electrical component outside the sliding door; and (2) attachment means for fixing a movable end of the cable carrier to the sliding door, wherein said movable end of said cable carrier follows movement of said door, as the door moves between the open and closed position, said cable carrier being mounted to said vehicle to be maintained substantially within a single generally horizontal plane, as the door is moved between said open position and said closed position.

In accordance with another aspect of the present invention, there is provided a method for controlling an elongated flexible cable carrier having a flexible conductor extending therethrough for connecting an electrical component inside a sliding door with an electrical component outside the sliding door, which sliding door is movable along a track between an open position and a closed position, the method comprising the steps of: (1) fixing a first end of an elongated flexible cable carrier relative to one end of said door for movement thereby; and (2) maintaining the cable carrier substantially within a first plane, as the door is moved between the open position and the closed position.

In accordance with still another aspect of the present invention, there is provided a hanger for attaching one end of an elongated flexible cable carrier, having a flexible conductor extending therethrough, with a sliding door that is movable along a track between an open position and a closed position, said hanger comprising: at least one vertical portion, and at least two horizontal portions spaced to receive a cable carrier link.

In accordance with yet another aspect of the present invention, there is provided a hold down clip for fixing one end of an elongated flexible cable carrier, having a flexible conductor extending therethrough, said clip comprising: (1) a first vertical portion; (2) first and second horizontal portions; and (3) a lip extending downward from one end of said second horizontal portion, wherein said flexible cable carrier is captured between said first vertical portion and said lip to define a fixed end of the cable carrier.

An advantage of the present invention is the provision of a cable guide assembly for a vehicle sliding door that is substantially maintained in a single plane during operation of the sliding door.

Another advantage of the present invention is the provision of a cable guide assembly for a vehicle sliding door wherein a cable carrier remains out of view during operation of the sliding door.

Still another advantage of the present invention is the provision of a cable guide assembly for a vehicle sliding door wherein the cable carrier replicates adjacent to itself, as the sliding door is moved between an open position and a closed position.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE PREFERRED EMBODIMENT

Figure 1:
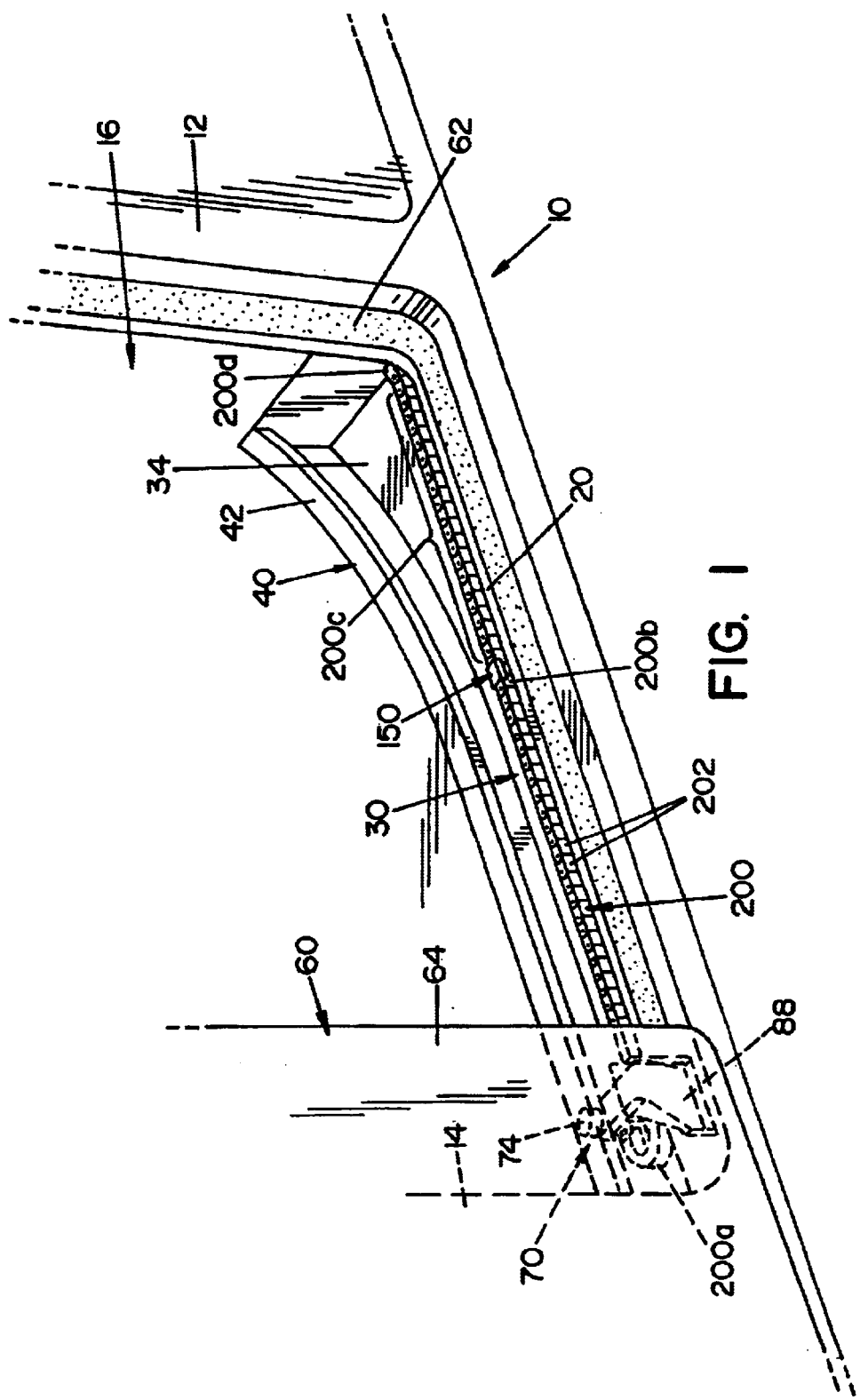
FIG. 1 is a perspective view of a lower portion of a sliding door opening for a vehicle body.

Referring now to the drawings wherein the showings are for the purposes of illustrating a preferred embodiment of the invention only and not for purposes of limiting same, FIG. 1 shows the lower portion of a sliding door opening for a vehicle body 10. Vehicle body 10 includes an opening 16 defined by a first body post 12, a second body post 14, a lower sidewall 20 and an upper sidewall (not shown). Opening 16 is dimensioned to receive a sliding door 60. A seal member 62 is mounted along the periphery of opening 16, and engages with an inner surface of door 60 when door 60 is in a closed position.

Sliding door 60 is slidably mounted on a lower track 40 and on an upper track (not shown). Lower track 40 includes a roller channel 42. A lower roller assembly 70 is adapted for cooperation with lower track 40. Likewise, an upper roller assembly (not shown) is adapted for cooperation with the upper track. Door 60 is mounted to lower roller assembly 70 and the upper roller assembly.

A generally planar floor 34 is located between lower track 40 and lower sidewall 20. A shallow cavity 30 extends the length of door opening 16, alongside lower track 40.

Figure 2:
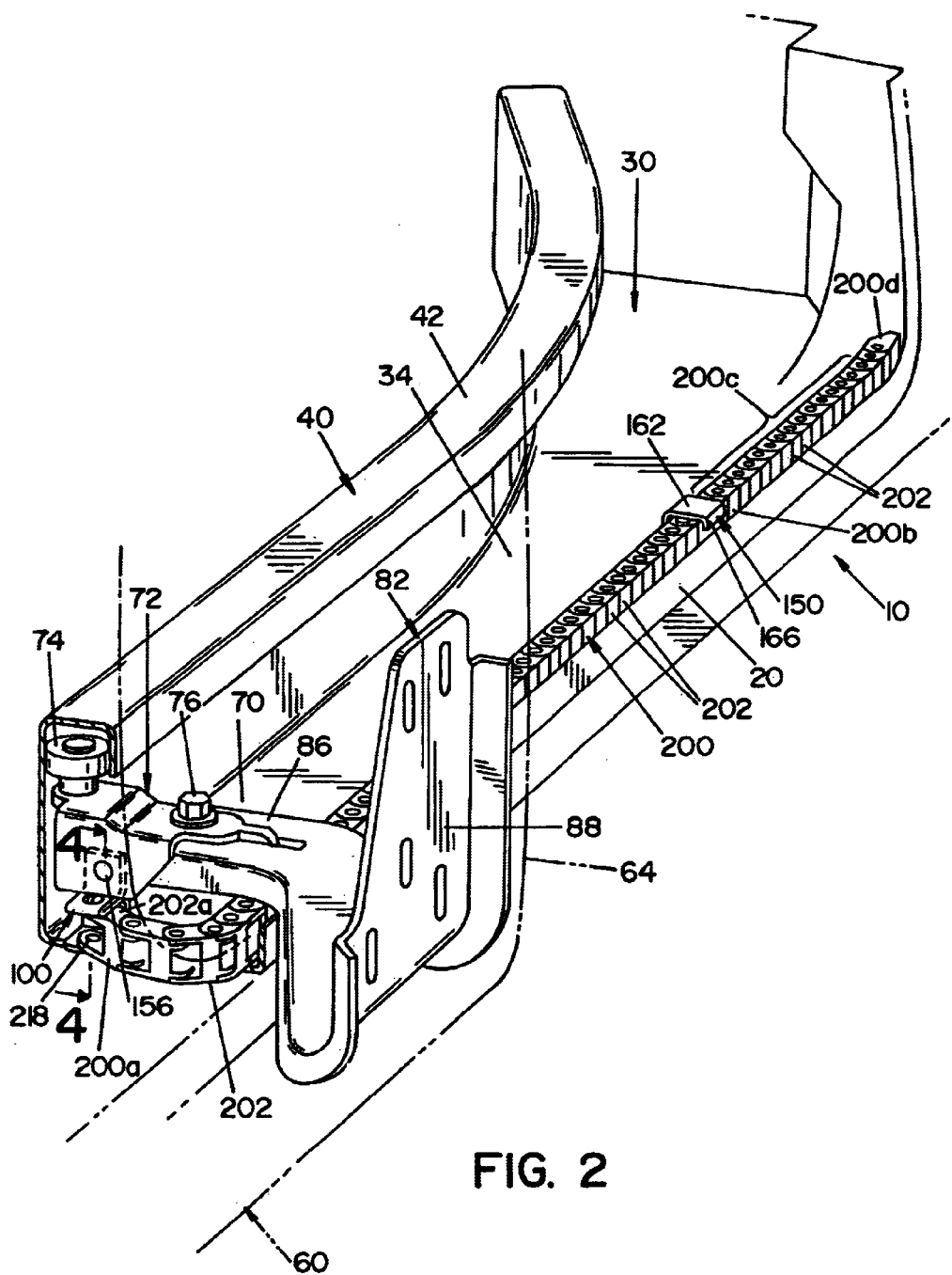
FIG. 2 is a perspective view of a cable guide assembly, according to a preferred embodiment of the present invention.
Figure 3:
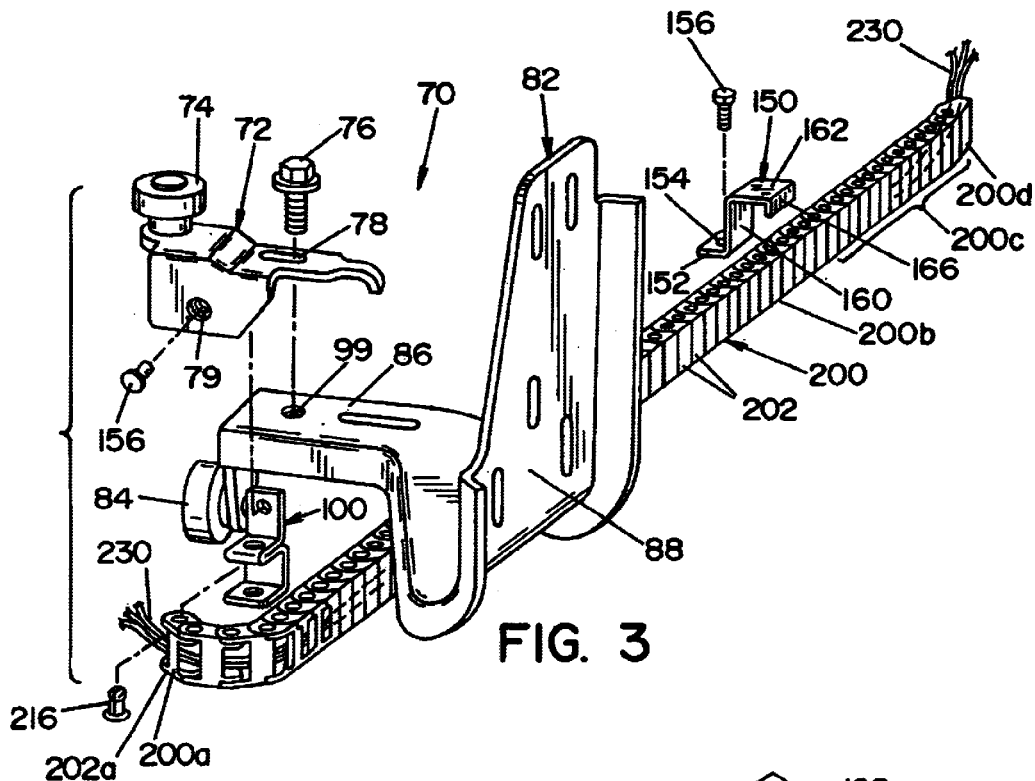
FIG. 3 is an exploded view of the cable guide assembly shown in FIG. 2.

As best seen in FIG. 3, lower roller assembly 70 is generally comprised of an upper roller bracket 72 and a door roller bracket 82. Upper roller bracket 72 includes a roller 74 that is dimensioned to be received within roller channel 42 of lower track 40 (see FIG. 2). A slot 78 is formed in upper roller bracket 72, and is dimensioned to receive a fastener 76 for connecting upper roller bracket 72 to door roller bracket 82. A hole 79 is formed in upper roller bracket 72, and is dimensioned to receive a fastener 156 for connecting a hanger 100 (discussed below) to upper roller bracket 72.

Door roller bracket 82 includes an arm 86 and a door mounting portion 88. Front end 64 of door 60 is mounted to door mounting portion 88. A hole 99 is formed in arm 86, and is dimensioned to receive fastener 76. Arm 86 includes a roller 84.

A cable assembly will now be described with reference to FIGS. 2–5. Cable assembly is generally comprised of a hanger 100, a hold down clip 150, and a flexible, bendable cable carrier 200. Hanger 100 is attached to upper roller bracket 72. In the illustrated embodiment, hanger 100 extends downward from upper roller bracket 72. A movable end 200a of cable carrier 200 is attached to hanger 100, as will be discussed in detail below. Hold down clip 150 is attached to floor 34 in cavity 30, to define a fixed end 200b of cable carrier 200, as will also be explained below.

Figure 4:
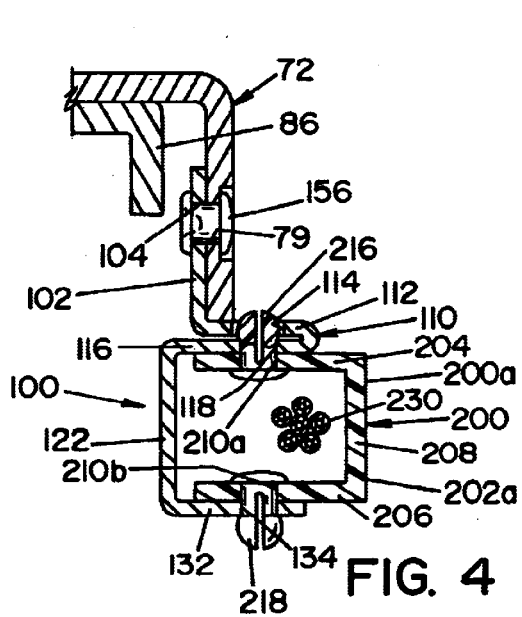
FIG. 4 is a cross-sectional view of the cable guide assembly, taken along lines 4—4 of FIG. 2.
Figure 5:
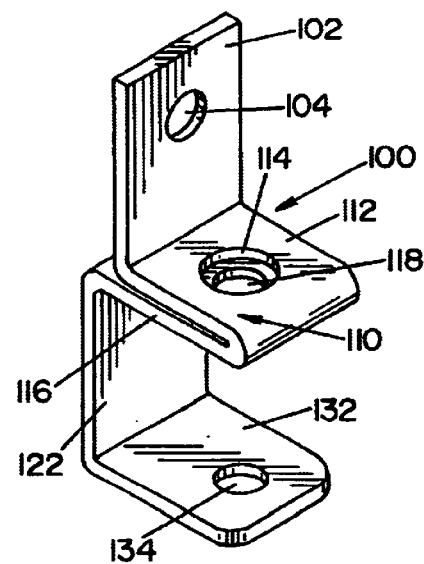
FIG. 5 is a perspective view of a hanger of the cable guide assembly, according to a preferred embodiment of the present invention.

In the embodiment shown, hanger 100 is formed from a single strip of metal. Alternatively, hanger 100 may be molded out of a suitable plastic material. Hanger 100 includes a first vertical portion 102, a horizontal folded portion 110, a second vertical portion 122 and a second horizontal portion 132, as best seen in FIG. 5. First vertical portion has a hole 104 dimensioned to receive a fastener 156 for attaching hanger 100 to upper roller bracket 72. In a preferred embodiment, first vertical portion 102 is attached to upper roller bracket 72 in a generally vertical orientation, whereby hanger 100 extends downward from roller bracket 72 (FIG. 4).

As best seen in FIG. 5, horizontal folded portion 110 is formed of a "bent over" portion of metal, and thus has a double wall thickness. Accordingly, horizontal folded portion 110 includes a first wall section 112 and a second wall section 116. First wall section 112 and second wall section 116 have respective holes 114 and 118 that are axially aligned with each other. Hole 118 is dimensioned to receive a fastener 216 for connecting cable carrier 200 with hanger 100. Second horizontal portion 132 includes a hole 134 dimensioned to receive a fastener 218 also for connecting cable carrier 200 with hanger 100. In a preferred embodiment, fasteners 216 and 218 are split-shank rivets having a shank with an enlarged end (see FIG. 4). The shank is split to enable fastener 216 to snap into holes 118 and 134. Hole 114 is dimensioned provide clearance for the enlarged end of the split shank rivet. In the illustrated embodiment, hole 114 has a larger radius than hole 118 to accommodate the enlarged end of split shank rivet.

It should be appreciated that the illustrated shape and dimensions of hanger 100 are provided solely for the purpose of disclosing a preferred embodiment of the present invention, and are not intended to limit the same. In this regard, attachment means of other shapes and dimensions that allow movable end 200a of cable carrier 200 to follow the movement of door 60 will find advantageous application in the present invention. Furthermore, it should be appreciated that such attachment means may take the form of a structure forming an integral portion of lower roller assembly 70.

As best seen in FIG. 3, hold down clip 150 is generally S-shaped, and includes a first horizontal portion 152, a vertical portion 160, a second horizontal portion 162 and a lip 166. First horizontal portion 152 includes a hole 154 dimensioned to receive a fastener 156 for attaching hold down clip 150 to floor 34 in cavity 30. Lip 166 extends downward from the one end of second horizontal portion 162. Cable carrier 200 is captured between vertical flange 166 and vertical portion 160, thereby defining a fixed end 200b of cable carrier 200 (see FIG. 2).

It should be appreciated that the illustrated shape and dimensions of hold down clip 150 are provided solely for the purpose of disclosing a preferred embodiment of the present invention, and are not intended to limit the same. In this regard, attachment means (including, but not limited to, fasteners) of other shapes and dimensions that define a fixed end 200b of cable carrier 200 will find advantageous application in the present invention.

Cable carrier 200 houses and guides a flexible electrical cable 230. Electrical cable 230 typically takes the form of a plurality of individually insulated flexible wires or conductors, as best seen in FIG. 4. Electrical cable 230 connects components located inside sliding door 60 with components located outside sliding door 60, in a conventionally known manner.

In the embodiment shown, cable carrier 200 is an elongated housing that is flexible in only a single plane. For example, cable carrier 200 may take the form of an E-Chain E2 Micro (part no. 045-10-018-0) from igust®. With reference to FIGS. 3 and 4, cable carrier 200 is comprised of a plurality of like, interlocking links 202. Links 202 are connected to each other such that two adjacent links 202 are pivotable relative to each other along a generally vertical axis. In the illustrated embodiment, each link 202 includes a first wall 204, a second wall 206 and a pair of connecting walls 208 that join first and second walls 204, 206 (FIG. 4). First wall 204 and second wall 206 have pins (not shown) at one end of each link 202, and have holes 210a, 210b at the other end of each link 202. The pins and holes 210a, 210b are used to join together links 202 in a conventionally known fashion to form cable carrier 200. It should be appreciated that illustrated cable carrier 200 is exemplary, and is not intended to limit the scope of the present invention. In this regard, cable carriers of other types may be suitably used in connection with the present invention.

Cable carrier 200 is mounted in such a manner as to maintain cable carrier 200 substantially within a single generally horizontal plane in cavity 30. In this regard, end 200a of cable carrier 200 is attached to hanger 100, as best seen in FIG. 4. End link 202a is disposed between second horizontal section 116 and second horizontal portion 132. Fasteners 216, 218 are located in holes 210a and 210b of end link 202a of cable carrier 200. Fasteners 216, 218 take the form of a push-in rivets in the illustrated embodiment. In a preferred embodiment of the present invention, end link 202a may pivot relative to hanger 100. A movable portion of cable carrier 200 is defined by movable end 200a and fixed end 200b.

It should be appreciated that fasteners 216, 218 are shown solely for the purpose of disclosing a preferred embodiment of the present invention, and that other types of fasteners are also suitable for use in connection with the present invention.

End 200b of cable carrier 200 is held down by hold down clip 150, and thus remains in a fixed location. An extension portion 200c of cable carrier 200, defined by fixed end 200b and second end 200d, is a stationary portion of cable carrier 200 extending beyond fixed end 200b. In a preferred embodiment, second end 200d of cable carrier 200 is fixed to vehicle body 10. It should be appreciated that extension portion 200c may be replaced with a conventional cable housing, such as a flexible tubular plastic housing or conduit.

Figure 6A:
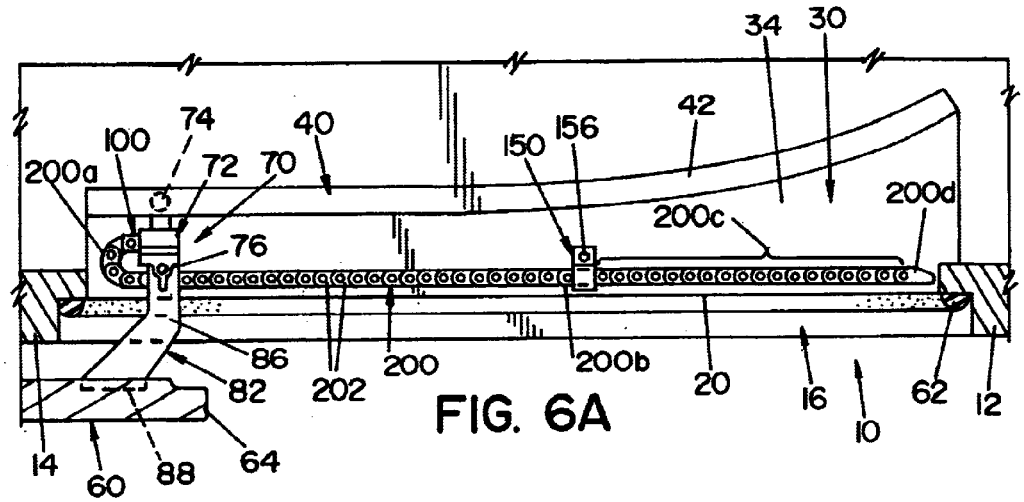
FIG. 6A is a partially sectioned top plan view of the lower portion of the sliding door opening shown in FIG. 1, wherein the sliding door is in an open position.
Figure 6B:
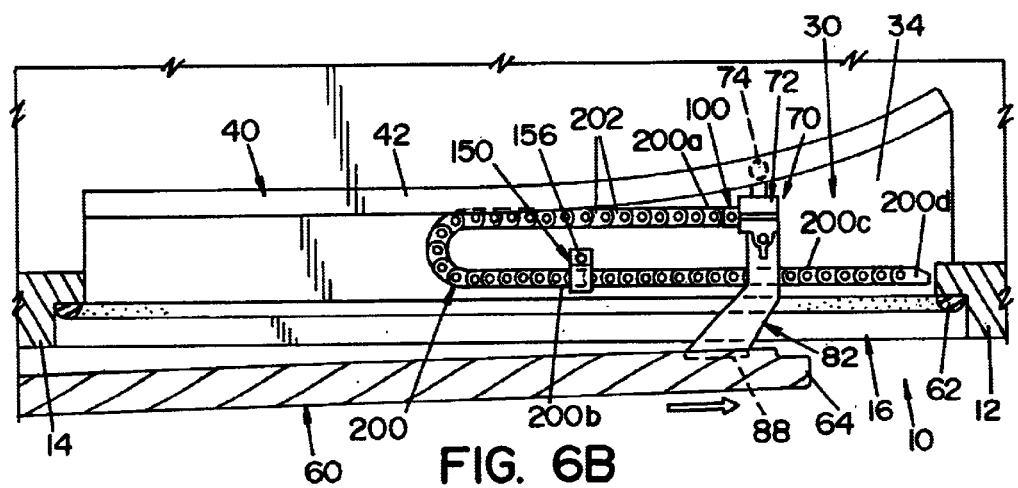
FIG. 6B is a partially sectioned top plan view of the lower portion of the sliding door opening shown in FIG. 1, wherein the sliding door is in an intermediate position.
Figure 6C:
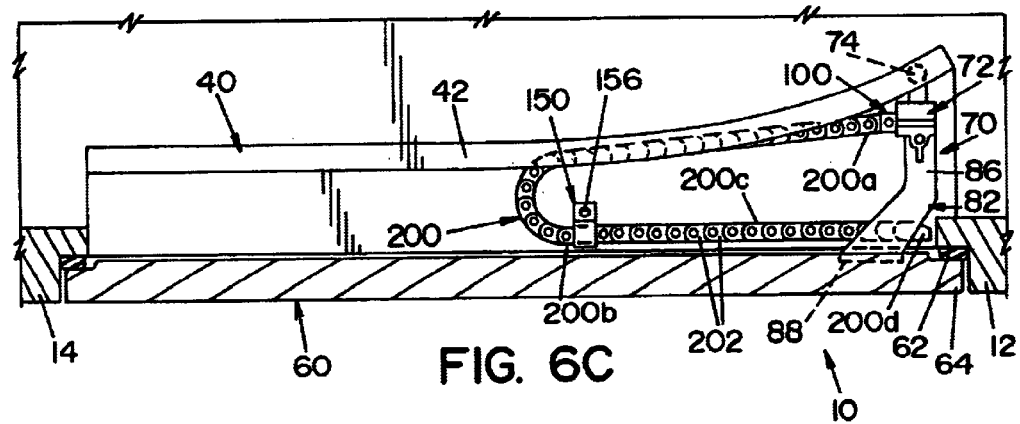
FIG. 6C is a partially sectioned top plan view of the lower portion of the sliding door opening shown in FIG. 1, wherein the sliding door is in a closed position.

Operation of the cable guide assembly will now be described with reference to FIGS. 6A–6C. Sliding door 60 is moveable between an open position (FIG. 6A) and a closed position (FIG. 6B). In the illustrated embodiment, sliding door 60 moves in a right hand direction from open position to closed position. Movable end 200a of cable carrier 200, attached to lower roller assembly 70, will follow sliding door 60, as door 60 moves between the open and closed positions. Hold down clip 150 maintains a section of cable carrier in a fixed position generally parallel to sidewall 20. The movable portion of cable carrier 200, defined by end 200a and end 200b, moves within a horizontal plane generally parallel to floor 34, as door 60 moves between the open and closed positions.

In the open position, cable carrier 200 is extended. As door 60 moves from the open position to an intermediate position (FIG. 6B), cable carrier 200 replicates adjacent to itself, past fixed end 200b. In FIG. 6C, door 60 is shown in the closed position. As door 60 continues moving to the closed position, it is guided inward by lower roller assembly 70, as it follows track 40. As lower roller assembly 70 moves inward, cable carrier 200 will likewise follow, and also move inward within the horizontal plane as it continues to replicate adjacent to itself (see FIG. 6C).

As door 60 is moved from the closed position (FIG. 6C) to the open position (FIG. 6A), cable carrier 200 will follow a reverse path to that described The present invention provides a cable guide assembly that does not twist or kink cable carrier 200 during operation of sliding door 60, and is less likely to damage (i.e., crimp or sever) the conductors of electrical cable 230. Furthermore, the cable guide assembly of the present invention provides quiet and smooth operation, and keeps cable carrier 200 out of view from passengers entering and exiting the vehicle.

Other modifications and alterations will occur to others upon their reading and understanding of the specification. For instance, the orientation of cable guide assembly can be reversed such that the cable carrier replicates adjacent to itself, as the sliding door is moved from a closed position to an open position. In this case, cable carrier is extended in the closed door position, rather than in the open door position of the preferred embodiment. It is intended that all such modifications and alterations be included insofar as they come within the scope of the invention as claimed or the equivalents thereof.

Having described the invention, the following is claimed:

1. A cable guide assembly for a sliding door on a vehicle, said sliding door movable along a track between a first position and a second position, the cable guide assembly comprising:

an elongated, bendable cable carrier having a first end and a second end, wherein a flexible conductor extends through the cable carrier for connecting an electrical component inside the sliding door with an electrical component outside the sliding door; and attachment means for fixing the first end of the cable carrier to the sliding door, wherein said first end of said cable carrier follows movement of said door, as the door moves between the first position and the second position, said cable carrier being mounted to said vehicle to be maintained substantially within a generally horizontal plane, as the door is moved between the first position and the second position, wherein the cable carrier replicates adjacent to itself behind the sliding door, as the sliding door is moved from the first position to the second position.

2. A cable guide assembly according to claim 1, wherein said attachment means includes a hanger for attaching said first end of said cable carrier to said door.

3. A cable guide assembly according to claim 2, wherein said hanger extends from a roller assembly, and is dimensioned to receive the first end of said cable carrier within said plane.

4. A cable guide assembly according to claim 2, wherein said hanger includes at least one vertical portion, and at least two horizontal portions.

5. A cable guide assembly according to claim 4, wherein said at least two horizontal portions each include a hole for receiving fastening means for attaching the first end of said cable carrier thereto.

6. A cable guide assembly according to claim 1, wherein said cable guide assembly further comprises:

a clip for capturing the cable carrier at a first location to define a fixed end of said cable carrier, relative to a vehicle body.

7. A cable guide assembly according to claim 6, wherein said clip is generally S-shaped.

8. A cable guide assembly according to claim 1, wherein said first position is an open position and said second position is a closed position.

9. A cable guide assembly according to claim 1, wherein said first position is a closed position and said second position is an open position.

10. A cable guide assembly according to claim 1, wherein said cable carrier is comprised of a plurality of interlocking links, each link pivotable about a first axis.

11. A method for controlling an elongated flexible cable carrier having a first end and a second end, wherein a flexible conductor extends through the cable carrier for connecting an electrical component inside a sliding door with an electrical component outside the sliding door, wherein the sliding door is movable along a track between an first position and a second position, said method comprising:

fixing the first end of the cable carrier relative to one end of said sliding door for movement thereby; and maintaining the cable carrier substantially within a generally horizontal plane, as the sliding door is moved between the first position and the second position, wherein the cable carrier replicates adjacent to itself behind the sliding door, as the sliding door is moved from the first position to the second position.

12. A method according to claim 11, wherein said first position is an open position and said second position is a closed position.

13. A method according to claim 11, wherein said first position is a closed position and said second position is an open position.

14. A method according to claim 11, wherein said method further comprises:

capturing the cable carrier at a first location to define a fixed end of said cable carrier, relative to a vehicle body.

15. A method according to claim 11, wherein said cable carrier is comprised of a plurality of interlocking links, each said link pivotable about a first axis.

* * * * *